United States Patent [19]
van der Lely et al.

[11] Patent Number: 5,769,023
[45] Date of Patent: Jun. 23, 1998

[54] CONSTRUCTION INCLUDING AN IMPLEMENT FOR AUTOMATICALLY MILKING ANIMALS

[75] Inventors: Olaf van der Lely, Steinhausen, Switzerland; Karel van den Berg, Bleskensgraaf, Netherlands

[73] Assignee: Maasland N.V., Maasland, Netherlands

[21] Appl. No.: 602,720

[22] Filed: Jun. 26, 1996

[30] Foreign Application Priority Data

Jun. 23, 1994 [NL] Netherlands ............................ 9401035

[51] Int. Cl.[6] .................................................... A01J 5/00
[52] U.S. Cl. ........................................................ 119/14.02
[58] Field of Search ............................. 119/14.01, 14.02, 119/14.08

[56] References Cited

U.S. PATENT DOCUMENTS

| 4,508,058 | 4/1985 | Jacokson et al. | 119/14.02 |
| 5,069,160 | 12/1991 | Street et al. | 119/14.08 |

FOREIGN PATENT DOCUMENTS

| 0 091 892 A3 | 10/1983 | European Pat. Off. . |
| 0 332 230 A2 | 9/1989 | European Pat. Off. . |
| 0 555 895 A1 | 8/1993 | European Pat. Off. . |
| 9200095 | 8/1993 | Netherlands . |
| 1240 108 | 7/1991 | United Kingdom . |

OTHER PUBLICATIONS

Int'l. Search Report for Int'l. Patent Appl. PCT/NL 95/00217, filed Jun. 19, 1995, Int'l Pub. No. 96/00003, published Jan. 4, 1996.

Primary Examiner—Thomas Price
Attorney, Agent, or Firm—Penrose Lucas Albright

[57] ABSTRACT

An apparatus including an implement for milking animals such as cows in one or more milking compartments, having at least one automatic feeding system, and at least one animal identification system, both connected to a computer. During the milking of the animal, a quantity of fodder which is adjusted for the particular animal is automatically supplied to that animal by a computer-controlled feeding system. This quantity of fodder is supplied so as to be distributed over the expected milking period.

29 Claims, 1 Drawing Sheet

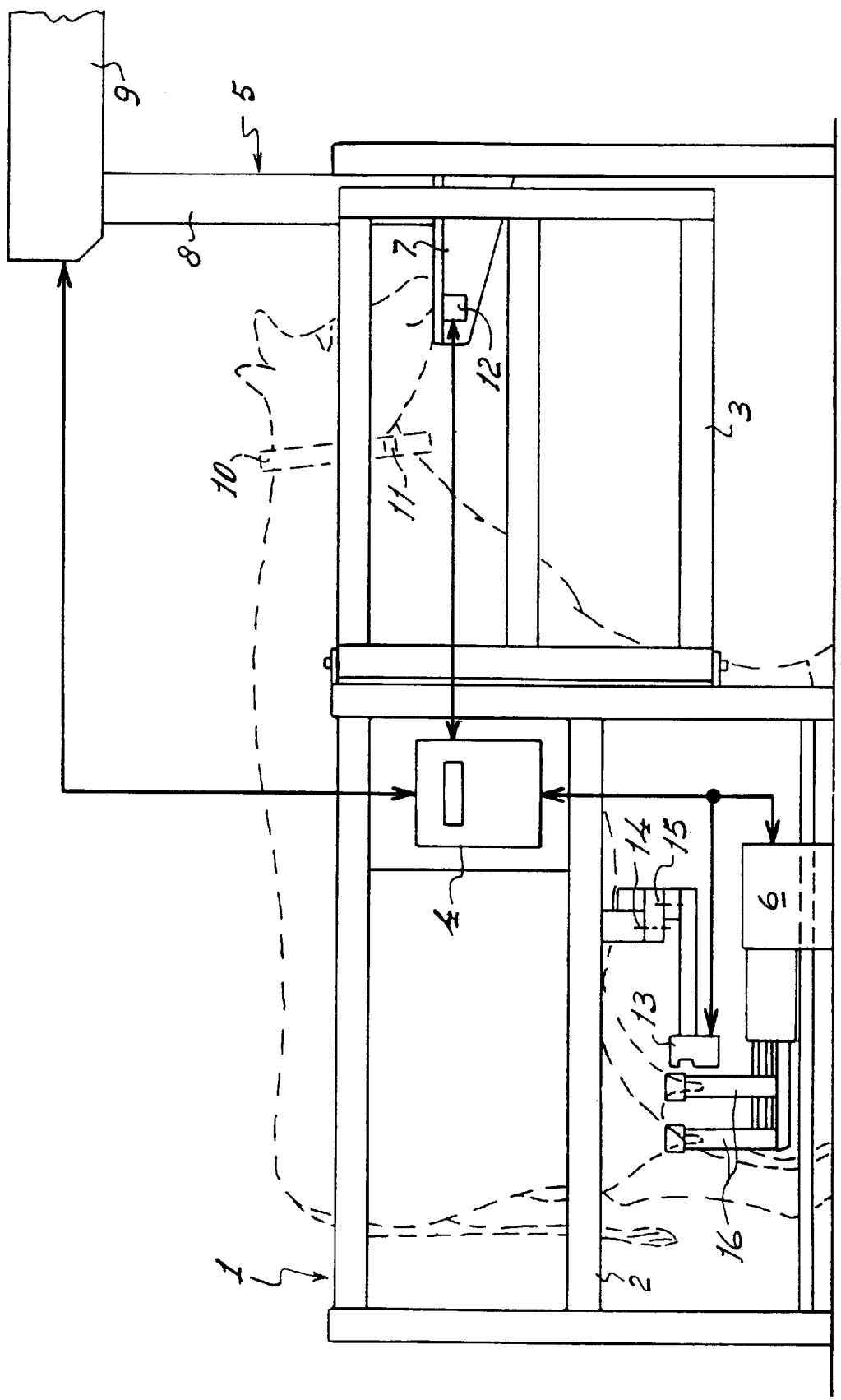

5,769,023

CONSTRUCTION INCLUDING AN IMPLEMENT FOR AUTOMATICALLY MILKING ANIMALS

FIELD OF THE INVENTION

The present invention relates to a construction including an implement for milking animals, such as cows, having one or more milking boxes, at least one automatic feeding system and at least one animal identification system connected to a computer means.

SUMMARY AND BACKGROUND OF THE INVENTION

Automatic feeding systems and their use with an implement for automatically milking animals are known. In order to optimize the performance of such implements as much as possible, the construction as defined in the opening paragraph is characterized in that, during the milking of an animal, a quantity of fodder, adjusted to said animal, is automatically supplied to said animal by a computer-controlled feeding system. This quantity of fodder, adjusted to each animal individually, is preferably supplied such that the flow of fodder is interrupted as little as possible. An animal reporting at or in a milking compartment for being milked, is identified there with the aid of the animal identification system, whereafter, on the basis of the data stored of this animal in the computer, it is determined how much fodder can be supplied to this animal during the time it is being milked. Thus, the quantity of fodder to be supplied is adjusted to the individual animals, which is beneficial to the quiet behaviour of the herd. The control can be such that the quantity of fodder to be supplied to an animal is fed forward in such a manner that it is automatically distributed over the expected milking period. The invention, therefore, also relates to an implement for automatically milking animals, such as cows, having one or more milking compartments, at least one automatic feeding system, at least one animal identification system connected to a computer means and one or more milking robots for automatically connecting teat cups to the teats of an animal, the construction then being characterized in that the quantity of fodder to be supplied to an animal is automatically distributed over the expected milking period by a computer-controlled feeding system.

When the length of the milking period of a specific animal is stored in the computer, then, with the aid of the automatic feeding system, the supply of fodder can be controlled such that it is distributed over the milking period to be expected on the basis of the data recorded in the computer. This does not only render it possible to adjust the quantity of fodder to the individual animals, but also that the supply of fodder versus the time is distributed over the expected milking period. Using such a fodder supply mode, adjusted to the individual animals, achieves to an increased extent that the animal feels at ease in a milking compartment, so that also connecting of the teat cups may be facilitated and the cow will be quiet during the full stay in the milking compartment.

After an animal has entered a milking compartment, then, by supplying fodder, the milk reflex can be stimulated and, even when the teat cups have not yet been connected, the animal may already release some milk. In connection therewith, the construction, in accordance with a further feature of the invention, is characterized in that a milking robot includes detection means for determining the position of the teats, and that the control of the feeding system is such that fodder is supplied to an animal as soon as the position of the teats has been determined and/or the teat cups are connected. By ensuring that the supply of fodder is not effected earlier than after the position of the teats has been determined, or the teat cups are connected to the teats of the animal, the milk reflex in response to the supply of fodder is prevented from being stimulated too soon. The invention, therefore, also relates to a construction including an implement for automatically milking animals, such as cows, having one or more milking compartments, at least one automatic feeding system, at least one animal identification system connected to a computer and one or more milking robots for automatically connecting teat cups to the teats of animal, while furthermore detection means are present for determining the position of the teats, the construction then being characterized in that the computer-controlled feeding system provides that fodder is supplied to an animal as soon as the position of the teats has been detected by the detection means and/or the teat cups are connected to the teats.

Connecting of the teat cups will not always proceed without tension for all the animals. It may happen that the teat cups are not connected during the first effort; several efforts may be necessary, which may cause an animal to become agitated, as a result of which it will have to stay for a longer period of time in the milking compartment. In connection therewith, the construction according to the invention is further characterized in that the control is such that, when connecting of the teat cups takes more time than is customary for the milking robot, the animal automatically receives a quantity of fodder that is adapted to the prolonged period of time it has to stay in a milking compartment. The invention, therefore, also relates to a construction including an implement for automatically milking animals, such as cows, having one or more milking boxes, at least one automatic feeding system, at least one animal identification system connected to a computer and one or more milking robots for automatically connecting teat cups to the teats of the animals, the construction then being characterized in that the feeding system has a control incorporating the computer, which control is such that, when connecting the teat cups requires a longer period of time than is customary for the milking robot, the animal automatically receives a quantity of fodder that is adapted to the prolonged period of time it has to stay in a milking box.

In accordance with a further feature of the invention, the aforementioned construction is characterized in that in the computer it is recorded which animals were found difficult to be milked in previous milkings, and that said animals are milked or allowed access to a milking compartment only or at least as much as possible during preferential hours, e.g. during daytime. For it may be necessary that the farmer must act personally in case of animals which are difficult to milk, e.g. because with young animals at the beginning of their lactation period or due to the shape of the udder, the automatic connecting of the teat cups proceeds with difficulty. It should, however, be avoided that the farmer must be available for that purpose at any moment of a twenty four hours period. The invention, therefore, also relates to a construction including an implement for automatically milking animals, such as cows, having one or more milking boxes, at least one automatic feeding system, at least one animal identification system connected to a computer and one or more milking robots for automatically connecting teat cups to the teats of the animals, the construction then being characterized in that it is recorded in the computer which animals proved to be difficult to milk in previous milkings, and that said animals are milked or allowed access to a milking compartment only or at least as much as possible during preferential hours, e.g. during daytime.

BRIEF DESCRIPTION OF THE DRAWINGS

For a better understanding of the invention and to show how the same may be carried into effect, reference will now be made, by way of example, to the accompanying DRAWING.

FIG 1 is a side elevational view of a milking compartment 1. This milking compartment in accordance with the invention comprised of a railing 2 having an entrance door arranged in the rear wall of the milking box 1, for which reason it is not visible, while moreover an exit door 3 is present, in the drawing shown at the leading end of the longitudinal side of the milking compartment. The implement additionally includes a computer 4, an automatic feeding system 5 and a milking robot 6. The feeding system 5 comprises a feeding trough 7 at the leading wall of the milking compartment 1, a fodder supply means 8 and a fodder hopper 9. The supply of fodder to the feeding trough 7 is controlled in the fodder hopper 9. For that purpose, the automatic feeding system 5 includes a control, of which the computer 4 is part. Put differently: with the aid of the computer 4 and the further fodder supply control means in the fodder hopper 9, the supply of fodder fed to an animal in the milking compartment can be controlled. Animals which are allowed to enter the milking compartment 1 are fitted with a collar 10, on which a transponder 11 is disposed. This transponder 11 cooperates with a sensor 12 installed near the feeding trough 7. The sensor 12 is connected to the computer 4. The transponder 11 and the sensor 12 constitute an animal identification system. Once an animal has entered the milking compartment 1 and has advanced sufficiently far, so that it can stick its head into the feeding trough 7, then the distance between the transponder 11 and the sensor 12 is such that communication between these two elements is possible, and the animal can be identified. Via the connection between the sensor 12 and the computer 4 it is possible to obtain access to the data file in the computer 4 of the relevant animal. From this file can inter alia be obtained data which are an indication of the position of the teats of the animal in the milking compartment 1, so that detection means 13, which in the inoperative state are located outside the milking compartment 1, can be pivoted by means of a pivotal motion about two vertical shafts 14 and 15 to under the udder of the animal into a defined position, so as to enable the determination of the position of the teats relative to the milking compartment 1. After the detection means 13 have determined, in cooperation with the computer 4, the position of the teats, the milking robot 6 is controlled such under the control of the computer 4 that teat cups 16 belonging to this robot can be connected to the teats of the animal, whereafter the animal is milked automatically.

In the file in the computer 4, in which all the relevant data about milking of each individual animal are updated, the milk yield per milking turn, optionally even for each udder quarter, is also permanently updated, together with several data about the health condition of the animal, as well as the quantity of fodder supplied during each milking turn and daily to the animal, while in the computer 4 it can likewise be determined how much fodder is to be given during each milking turn to yield an optimum milk production. In other words: the feeding system has a control incorporating a computer, 4 which control is such that, during the period of time an animal is being milked, a quantity of fodder adjusted to this animal is automatically supplied to it. In order to keep the animal quiet during the anticipated milking period, based on the milking periods recorded in the data file of the relevant animal, so that automatic connecting of the teat cups 16 and the subsequent milking operation can be effected without problems, the control must further be such that the quantity of fodder to be fed to an animal is supplied in such a manner that it is automatically distributed over the expected milking period. Although the supply of fodder may be effected at the instant at which the animal has entered the milking compartment 1, it may be advantageous to wait therewith until the instant at which the position of the teats is determined or has been determined and the teat cups 16 are being connected. For prior to that instant, the fact whether the animal stands quietly in the milking compartment 1 may be of less importance, while on the other hand there is a risk that, since the supply of food may initiate the milk reflex, the animal releases milk already.

With some animals, the position of the teats can be so unfavorable that connecting of the teat cups 16 proceeds with difficulties, or sometimes does even not succeed at all. The teats can be located very close to each other, or at unequal heights. When connecting of the teat cups 16 does not succeed, then the farmer must be near to interfere, as otherwise the animal is not milked and is driven from the milking compartment 1, so that the next time the animal reports again must be waited for. This state of affairs has for its result that the repeated efforts to connect the teat cups 16 to the teats cause the animal to stay in the milking compartment 1 longer than is normal, so that this fact must be taken into account in the supply of fodder. Therefore, measures have been taken in the computer program controlling the supply of fodder to take into account, when calculating the quantity of fodder to be supplied to an animal during its stay in the milking compartment 1, a longer stay of the animal in the milking compartment 1 due to the fact that it is difficult to connect the teat cups 16. To prevent that the farmer is confronted at any moment of the hours' period with an animal which reports in the milking compartment 1 and is difficult to be milked, e.g. because problems occur during connecting of the teat cups 16, it is advantageous to milk these animals only in predetermined preferential hours, more specifically during the daytime. This means that animals, which are difficult to be milked and which report at the milking compartment 1, are either not allowed access to the milking compartment 1 or, when they are allowed to enter the milking compartment 1 without further measures, provided the milking compartment 1 is free, are expelled therefrom without having been milked. In the first-mentioned case, i.e. when the animals are not allowed access to the milking compartment 1, the sensor 12 will not be disposed at the feeding trough 7 but near to the entrance of the milking compartment 1, so that the animals can be identified before they can enter the milking compartment 1.

The invention is in no way limited to the embodiment described here; many of modifications, of course falling within the scope of the claims following hereafter, remain possible. Thus, it will, for example, be possible to install a plurality of milking compartment 1, with a plurality of computers 4, optionally a separate computer for the feeding system 5 and for the milking robot 6. Several computers may be integrated in a complete computer system.

Having disclosed our invention, what we claim as new and to be secured by Letters Patent of the United States is:

1. An apparatus for milking an animal, comprising:
    a milking compartment,
    an automatic feeding system,
    an animal identification system connected to a computer,
    said computer programmed for controlling said automatic feeding system thereby providing a computer-controlled feeding system, wherein during said milking of said animal, a quantity of fodder, adjusted to said animal, is automatically supplied to said animal by said computer-controlled feeding system, and wherein said computer-controlled feeding system controls said quantity of fodder automatically supplied to said animal so that said quantity of fodder is automatically distributed to said animal substantially over an expected milking period for said animal in a flow of said fodder which is substantially uninterrupted.

2. An apparatus as claimed in claim 1 further comprising:

a milking robot which includes detection means for determining a position of a teat, wherein said fodder is supplied to said animal subsequently after said position of said teat has been determined by said detection means.

3. An apparatus as claimed in claim 1, wherein stored in said computer is information which is associated with an animal which proved to be difficult to milk in previous milkings, and, based on said information, said computer further provides that said animal which proved to be difficult to milk in previous milkings is milked substantially only during a predetermined period of the day.

4. An apparatus as claimed in claim 1 further comprising:

a milking robot comprising a teat cup, and wherein said flow of said fodder commences subsequent to said teat cup being connected to a teat of said animal.

5. An apparatus as claimed in claim 1 further comprising a milking robot comprising a teat cup and wherein when said connecting of said teat cup to said teat takes more time than is customary for said milking robot, said computer-controlled feeding system further provides that said animal automatically receives an additional quantity of fodder which is commensurate with an additional period of time that said animal has to stay in said milking compartment for milking, said additional quantity of fodder being provided to said animal before said teat cup is operatively connected to said teat.

6. An apparatus as claimed in claim 1 further comprising a detection device for detecting a position of a teat, said detection device operatively connected to said computer and wherein said computer-controlled feeding system commences said flow of said fodder automatically when said position of said teat has been detected by said detection device.

7. An apparatus for milking an animal, comprising:

a milking compartment, an automatic feeding system and an animal identification system connected to a computer means, said computer means controlling said automatic feeding system thereby providing a computer-controlled feeding system, wherein a quantity of fodder, adjusted to said animal and automatically supplied by said computer-controlled feeding system to said animal, is automatically distributed over an expected milking period for said animal by said computer-controlled feeding system.

8. An apparatus as claimed in claim 7, wherein said quantity of fodder supplied to said animal is supplied in a flow of said fodder which is substantially uninterrupted and adjusted, at least in part, in response to the identification of said animal by said animal identification system and, at least in part, to emplacement of a teat cup on said animal's teat.

9. An apparatus as claimed in claim 7 further comprising:

a milking robot including a teat cup, and wherein said flow of said fodder commences subsequent to said teat cup being connected to a teat of said animal.

10. An apparatus for milking an animal, comprising:

a milking compartment, an automatic feeding system, an animal identification system connected to a computer, said computer programmed for controlling said automatic feeding system thereby providing a computer-controlled feeding system, a milking robot for automatically connecting a teat cup to a teat of said animal, and a detection means for determining the position of said teat, wherein said computer-controlled feeding system provides that fodder is automatically supplied to said animal in a flow of said fodder distributed substantially over an expected milking period for said animal.

11. An apparatus as claimed in claim 10, wherein when said connection of said teat cup takes more time than is customary, said computer-controlled feeding system further provides that said animal automatically receives an additional quantity of fodder which is commensurate with a prolonged period of time said animal has to stay in said milking compartment for said milking.

12. An apparatus as claimed in claim 10 wherein said computer-controlled feeding system commences said flow of said fodder automatically when said teat cup is connected to said teat.

13. An apparatus as claimed in claim 10 wherein said computer-controlled feeding system commences said flow of said fodder automatically when the position of said teat has been detected by said detection device.

14. An apparatus as claimed in claim 10 wherein when said connection of said teat cup takes more time than is customary, said computer-control feeding system further provides that said animal automatically receives said fodder at a rate distributed substantially over said expected milking period for said animal.

15. An apparatus for milking an animal comprising:

a milking compartment, an automatic feeding system, an animal identification system connected to a computer means, said computer means controlling said automatic feeding system providing a computer-controlled feeding system, said computer-controlled feeding system providing that said animal automatically receives a predetermined amount of fodder substantially throughout said milking, and a milking robot for automatically connecting a teat cup to a teat of said animal, said computer-controlled feeding system providing that when said connecting of said teat cup to said teat takes more time than is customary for said milking robot, said computer-controlled feeding system further provides that said animal automatically receives an additional quantity of fodder which is commensurate with a prolonged period of time said animal has to stay in said milking compartment for said milking.

16. An apparatus for milking an animal found to be difficult to milk from prior experience comprising:

a milking compartment, an automatic feeding system which supplies said animal with fodder automatically distributed substantially over an expected milking period for said animal, an animal identification system connected to a computer means, a milking robot for automatically connecting a teat cup to a teat of each said animal, said computer means having information stored therein associated with said animal which proved to be difficult to milk in previous milkings, and, based on said information, said computer means providing that said animal which proved to be difficult to milk in previous milkings is milked substantially only during a predetermined period of the day.

17. An apparatus as claimed in claim 16 wherein, based on said information, said computer means provides that said animal which proved to be difficult to milk in previous milkings is prevented from accessing said milking compartment during times which are not within said predetermined period of the day.

18. An apparatus for milking an animal, comprising:

a milking compartment, a milking robot including a teat cup, an automatic feeding system and an animal identification system connected to a computer means, said computer means controlling said automatic feeding system thereby providing a computer-controlled feeding system, wherein a quantity of fodder, adjusted to said animal and automatically supplied by said computer-controlled feeding system to said animal, is automatically distributed over an expected milking period for said animal by said computer-controlled feeding system, and when connecting said teat cup takes more time than is customary for said milking robot, said computer-controlled feeding system further provides that said animal automatically receives an additional quantity of fodder which is commensurate with an additional period of time said animal has to stay in said milking compartment to complete milking.

19. An apparatus for milking an animal comprising:

a milking compartment,
said milking compartment comprising an entrance door, an exit door and a longitudinal side, a milking robot,
said milking robot comprising a detection means and a teat cup, said detection means being capable of determining the position of a teat of said animal,
said milking robot automatically connecting said teat cup to said teat of said animal for obtaining milk therefrom, an animal identification system,
said animal identification system comprising a collar and a sensor,
said collar connected to said animal,
said collar comprising a transponder,
said transponder emitting a signal associated with said animal,
said sensor sensing said signal, an automatic feeding system,
said automatic feeding system comprising a feeding trough, a fodder supply
means and a fodder hopper,
said fodder hopper comprising a fodder supply control means, a computer system,
said computer system comprising cooperation means to cooperate with said detection means to determine said position of said teat, controlling means to control said milking robot, connection means to said sensor to detect said signal via said sensor, a data file containing information associated with said animal, and a further controlling means controlling said fodder supply control means,
said cooperation means determining said position of said teat,
said controlling means directing said milking robot to connect said teat cup to said teat to obtain said milk therefrom,
said connection means detecting said signal associated with said animal and said computer recognizing said animal from said signal,
said computer obtaining from said data file said information associated with said animal,
said information comprising data which determines an expected length of time for milking said animal during a milking turn and further data which determines an optimal quantity of said fodder to be supplied to said animal during said milking turn,
said further controlling means controlling said fodder supply control means to supply said optimal quantity of said fodder to said trough in a flow which is distributed over said expected length of time for milking said animal during said milking turn.

20. An apparatus as claimed in claim 19 wherein said flow of said fodder commences subsequent to said determining of said position of said teat.

21. An apparatus as claimed in claim 19 wherein said flow of said fodder commences subsequent to said connecting said teat cup to said teat.

22. An apparatus as claimed in claim 19 wherein said information further comprises data which determines a delay of said milking robot in connecting said teat cup to said teat due to an impediment, and said expected length of time for milking said animal during said milking turn further comprises said delay.

23. An apparatus as claimed in claim 22 wherein when said delay of said milking robot in connecting said teat cup to said teat of said animal due to said impediment is determined to be longer than a length of time whereby intervention of a user is advantageous, said animal is milked in said milking compartment and supplied with said fodder in said milking compartment only during predetermined hours of a day.

24. An apparatus as claimed in claim 23 wherein said sensor is disposed near said entrance door in a manner to receive said signal when said animal approaches said entrance door in order to access said milking compartment and said animal, for which said delay is determined longer than said length of time whereby intervention of said user is advantageous, is admitted into said milking compartment only during predetermined hours of a day.

25. A method of automatically milking an animal comprising:

admitting said animal into a milking compartment, automatically milking said animal with a milking robot, automatically supplying said animal with a quantity of fodder in a substantially uninterrupted flow, significantly distracting said animal with said fodder by commencing said flow automatically at a point of time after said admitting of said animal into said milking compartment and automatically stopping said flow after said milking.

26. An method as claimed in claim 25 wherein said point of time comprises when a position of a teat of said animal is automatically determined.

27. An method as claimed in claim 25 wherein said point of time comprises when a teat cup is automatically connected to a teat of said animal.

28. An method as claimed in claim 25 wherein said supplying to said animal said quantity of said fodder, when said animal can only be milked at least in part manually, occurs only during a predetermined period of a day.

29. An method as claimed in claim 25 wherein said admitting said animal into said milking compartment, when said animal can only be milked at least in part manually, occurs only during a predetermined period of a day.

* * * * *